United States Patent [19]
Watson et al.

[11] Patent Number: 5,821,916
[45] Date of Patent: Oct. 13, 1998

[54] DIGITIZER CURSOR VELOCITY OFFSET ERROR CORRECTION SYSTEM

[75] Inventors: James S. Watson; Dana Doubrava, both of Phoenix, Ariz.

[73] Assignee: CalComp, Inc., Anaheim, Calif.

[21] Appl. No.: 929,971

[22] Filed: Aug. 13, 1992

[51] Int. Cl.⁶ .................................................. G09G 5/08
[52] U.S. Cl. ...................................... 345/145; 178/18.02
[58] Field of Search ............................. 33/1 M; 340/209; 178/18, 19, 18.01, 18.02, 19.01, 20.01; 345/145, 157, 178

[56] References Cited

U.S. PATENT DOCUMENTS

| | | | |
|---|---|---|---|
| 4,255,617 | 3/1981 | Carau, Sr. et al. | 178/18 |
| 4,571,454 | 2/1986 | Tamaru et al. | 178/18 |
| 4,754,267 | 6/1988 | Reynolds et al. | 340/709 |
| 4,831,566 | 5/1989 | Mathews et al. | 178/18 |
| 5,229,551 | 7/1993 | McDermott et al. | 178/18 |

*Primary Examiner*—Amare Mengistu
*Attorney, Agent, or Firm*—Michaelson & Wallace

[57] ABSTRACT

Methods and apparatus are shown for correcting velocity-induced offset errors in a digitizing system when the cursor is moved diagonally across a sensing grid. Primarily, this is a system for reducing the offset error in the actual and depicted cursor position when a pen cursor is moved rapidly over a digitizing screen of a pen-driven computer. It also provides double the number of positional outputs for added accuracy. A triplet of data is formed by taking two samples from one axis and one from the second axis. The two samples are averaged to form one component of the cursor position and then the average along with the single sample from the other axis are output as the positional coordinates. A second sample is then taken from the second axis to form a new data triplet. The averaging process is repeated with the two data points from the second axis and the average along with the second sample from the first axis are output as a next position of the cursor. The process of inputting a next data point from the axis other than the last sampled to form sequential data triplets is repeated to track the movement of the cursor and output its position.

17 Claims, 4 Drawing Sheets

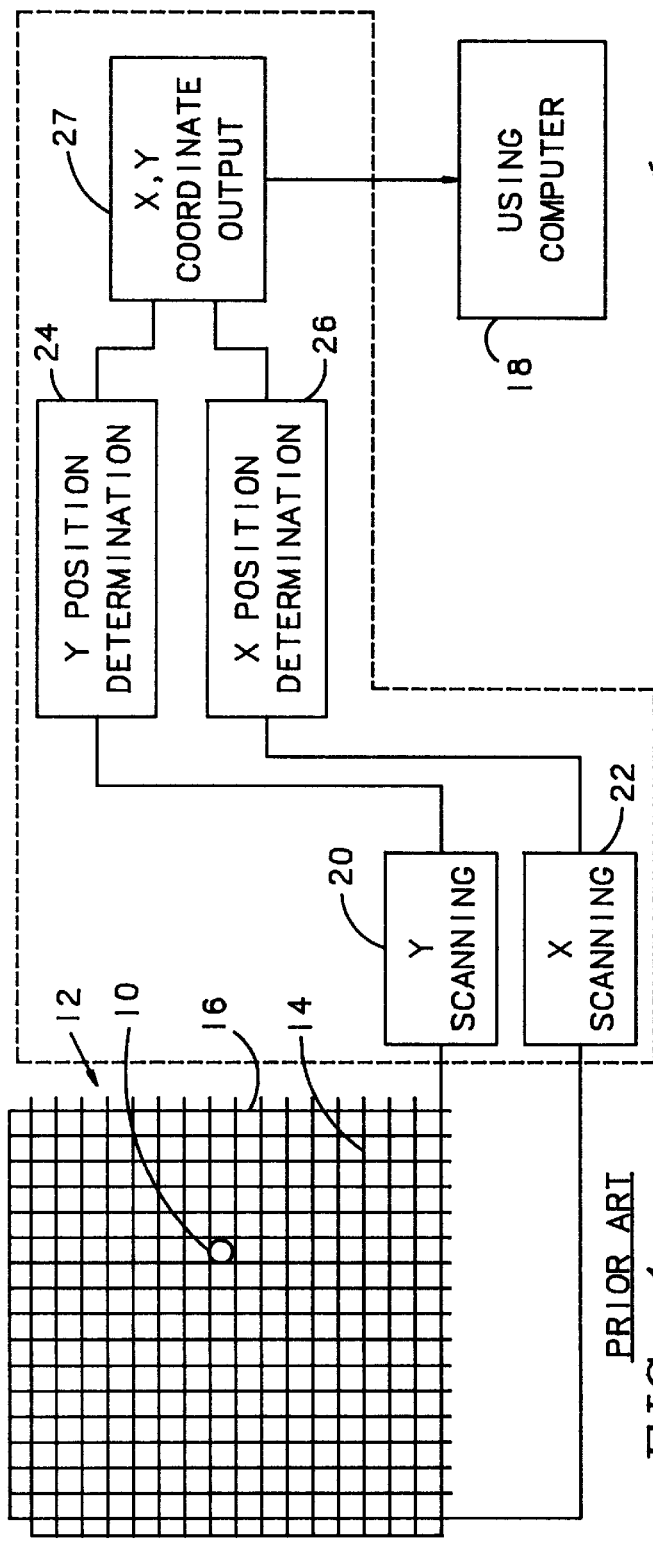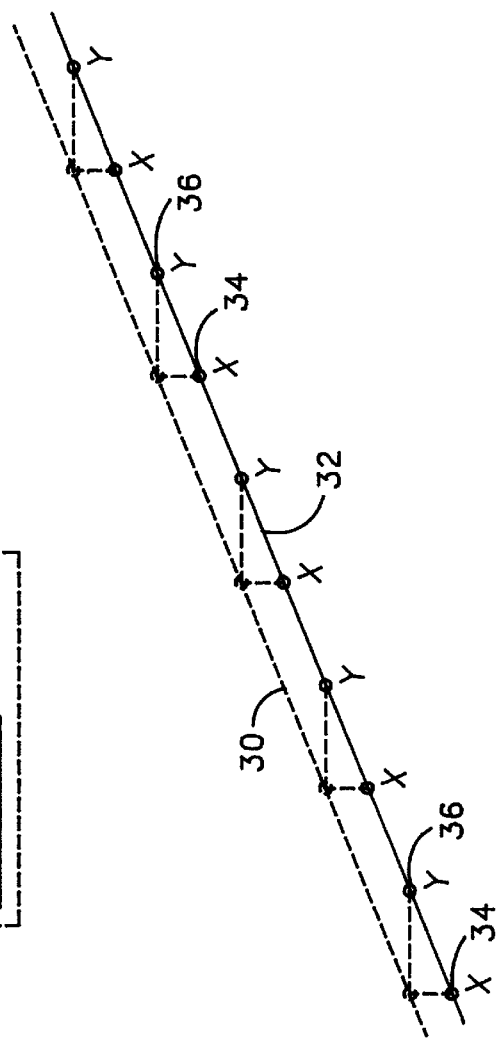

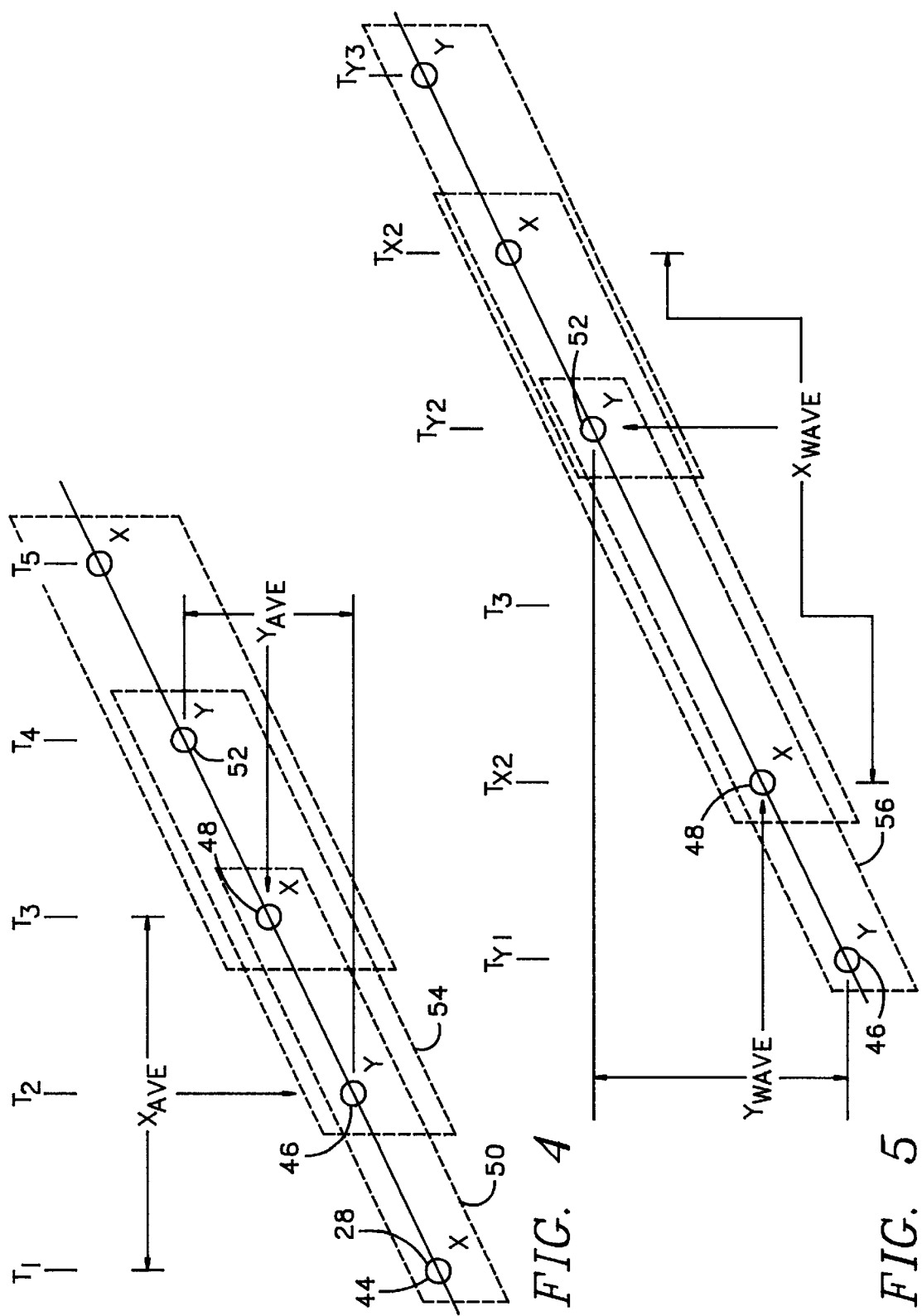

DIGITIZER CURSOR VELOCITY OFFSET ERROR CORRECTION SYSTEM

BACKGROUND OF THE INVENTION:

The present invention relates to digitizers in which the position of a cursor on the surface of a tablet is continually detected and provided to a computer connected thereto; and, more particularly, to a system for reducing the offset error in the actual and depicted cursor position when a pen cursor is moved rapidly over a digitizing screen of a pen-driven computer or the like.

Digitizers for detecting the position of a cursor configured as a puck or a pen on the surface of a tablet are well known in the art. An example thereof as manufactured and sold by the assignee of this application is depicted in FIG. 1. Magnetic pulses are generated by sending a current signal through a conductive coil 10 which is placed in the tip of a pen cursor or encircles the target window of a puck cursor. A tablet or screen having an associated grid 12 of horizontally and vertically criss-crossed wires 14, 16 periodically samples the X and Y axes of the grid 12 to detect the position of the magnetic pulses from the coil 10 (and, thereby, the cursor), relaying the positional information back to a computer 18 connected thereto, which can then employ the positional information for a variety of purposes. To accomplish this, Y scanning circuitry 20 is connected to the horizontal grid wires 14 and X scanning circuitry 22 is connected to the vertical grid wires 16. The scanning circuitry 20, 22 can scan across the grid wires 16, 14 in sequence to determine the position of the coil 10 in each of the coordinate directions X,Y by finding the grid wires 16, 14 having the strongest induced signal and interpolating to find the exact position according to well known mathematical techniques in the Y position determination logic 24 and X position determination logic 26 connected to the scanning circuitry 20, 22, respectively. The present X,Y position of the coil 10 is then output by the output circuitry 27 to the computer 18.

While until quite recently digitizers were stand-alone devices primarily employed for uses such as inputting to CAD systems and the like, the recent introduction of so-called pen-driven computers has changed that considerably. In a pen-driven computer, the traditional alphanumeric keyboard is replaced by a digitizer as the input device. The grid wires of the digitizer "tablet" are directly associated with a display such as a liquid crystal display. Thus, the display and grid wires in combination operate in much the same manner as the light pens employed with cathode ray tube displays many years ago. Typically, a pen cursor is employed to "write" on the digitizing display. As the pen cursor is moved over the surface of the display, its position is sensed and a corresponding point indicia is displayed. Thus, as the user writes on the display, the movement of the pen cursor is displayed just as if the pen cursor were writing with ink on paper.

While not a problem with CAD inputting, moving the pen cursor at a high rate of speed over the grid wires can cause tracking errors in digitizers which sample the wires of the X and Y coordinates sequentially as described above. Such tracking errors can cause interpretation errors in handwriting analysis performed in pen-driven computers. The potential problem is depicted in FIG. 2 for a cursor being moved at an angle with respect to the X and Y coordinate system of the tablet. As the cursor (symbolized by the circle 28) is moved at a high uniform velocity and periodically sampled at a regular rate, the apparent and displayed path 30 of the cursor 28 as output to the computer is offset from the true cursor path 32. This is due to the change in position of the cursor 28 between the collection of the X positional components 34 during the X data input scan and the subsequent collection of the Y positional components 36 of the coordinate set. In other words, all the X positional components 34 are scanned and gathered first. By the time the scanning of the Y positional components 36 begins, the cursor 28 has moved further along its true path 32 a finite distance. Thus, when the Y position of the cursor is sensed and input, and then correlated with its associated X position, a false position 38 is output as the position of the cursor 28 since the data used to derive the apparent position of the cursor 28 is not a true instantaneous snapshot of both the X and Y positional components 34, 36; but rather, X and Y positional components at two different points in time during which the cursor continued to move. As the positional coordinate pairs are collected and plotted, they trace the offset track 30. The offset track 30 is offset from the true path 32 by a distance which is proportional to the velocity of the cursor.

The foregoing effect can be especially troublesome in pen-driven systems being used in a handwriting analysis mode. For example, when script letters with elongated loops (such as a lower case "l") are included in the handwriting being analyzed, the loop portion of the letters may appear as a line instead of a loop if rapid movement of the pen is employed in the drawing of the loop.

The obvious solution to this problem is to increase the sampling rate of the grid wires so as to make the "snapshot" of the positional data faster and essentially freeze the cursor's position during each X and Y positional determination despite the velocity at which the cursor is being moved by the user. Unfortunately, an increased sample rate is accompanied by a corresponding reduction in the sample period over which the signal from each grid wire is integrated. This results in positional signal samples of poor resolution due to the increased noise effect incurred thereby. In other words, while the sample snapshot is shorter so as to eliminate the effects of velocity, the data is also unstable resulting in signal jitter which, in turn, introduces an instability in the positional signal generated. Thus, instead of merely being offset, the apparent track of the cursor becomes erratic.

Wherefore it is the object of this invention to provide methods and associated apparatus for reducing or eliminating the offset error caused by high velocity pen cursor movements over a digitizing tablet without increasing the sampling rate and shortening the sample period.

It is the further object of this invention to double the rate at which cursor position signals of a digitizing system are output to a computer connected thereto.

It is still a further object of this invention to eliminate the offset error caused by high velocity pen movements in a digitizing system which can sample the cursor position at a regular or a non-uniform rate.

Other objects and benefits of the invention will become apparent to ones skilled in the art from the detail description which follows hereinafter when taken in conjunction with the drawing figures which accompany it.

SUMMARY

The foregoing objects have been achieved in a pen-driven computing system where a cursor is moved over a display having a digitizer grid associated therewith by the control logic of the present invention for sequentially outputting accurate X,Y positions of the cursor in an X,Y coordinate system having an X axis and a Y axis perpendicular to the X axis during rapid movement of the cursor over the display comprising, first logic means for obtaining a first sample of a positional signal from the cursor in the digitizer grid in the X axis of the coordinate system; second logic means for obtaining a first sample of a positional signal from the cursor in the digitizer grid in the Y axis of the X,Y coordinate system; third logic means for obtaining a second sample of a positional signal from the cursor in the digitizer grid in the X axis to form a positional data triplet $X_1,Y_1,X_2$; fourth logic means for combining the $X_1$ sample with the $X_2$ sample to form an average $X_{AVE}$; fifth logic means for outputting $X_{AVE}$ along with $Y_1$ as a first position of the cursor; sixth logic means for obtaining a second sample of a positional signal from the cursor in the digitizer grid in the Y axis to form another positional data triplet $Y_1,X_2,Y_2$; seventh logic means for combining the $Y_1$ sample with the $Y_2$ sample to form an average $Y_{AVE}$; eighth logic means for outputting $Y_{AVE}$ along with $X_2$ as a subsequent present position of the cursor in the coordinate system; and, ninth logic means for employing the first logic means through the eighth logic means to form sequential data triplets and output further subsequent present positions of the cursor in the coordinate system.

Where the samples are not taken on a regular basis, each logic means combining samples to form an average includes means for employing a time of acquisition of each of two samples and for calculating the average as a time-weighted average.

A separate point of novelty is a digitizer system wherein a clock is employed to associate a time of acquisition for each data point in the X and Y coordinate axes and a time-weighted average of adjacent points in a given axis is employed in the calculation of present points of the moving cursor.

DESCRIPTION OF THE DRAWINGS

FIG. 1 is a simplified partial functional block diagram of a digitizer according to the prior art.

FIG. 2 is a drawing depicting operation of the prior art digitizer system of FIG. 1 and showing sequential sampling and an associated offset error when the cursor is moved at a high rate of speed diagonally across the tablet.

FIG. 4 is a drawing illustrating the method of sampling the cursor moved at a high rate of speed diagonally across the tablet according to the present invention when the sampling is performed at a uniform rate.

FIG. 5 is a drawing illustrating the method of sampling the cursor moved at a high rate of speed diagonally across the tablet according to the present invention when the sampling is performed at a non-uniform rate.

DESCRIPTION OF THE PREFERRED EMBODIMENT

The present invention will now be described with respect to implementation in a system wherein the digitizer grid is associated with a display screen and the cursor is of the pen type as is common in pen-driven computers. As those skilled in the art will recognize and appreciate, the novel aspects of the invention can be adapted to any digitizer-based cursor detection system. Accordingly, the breadth accorded the claims appended hereto is intended to reflect the scope and spirit of the invention being described herein and not be limited by the use of a specific example.

Figure 3:
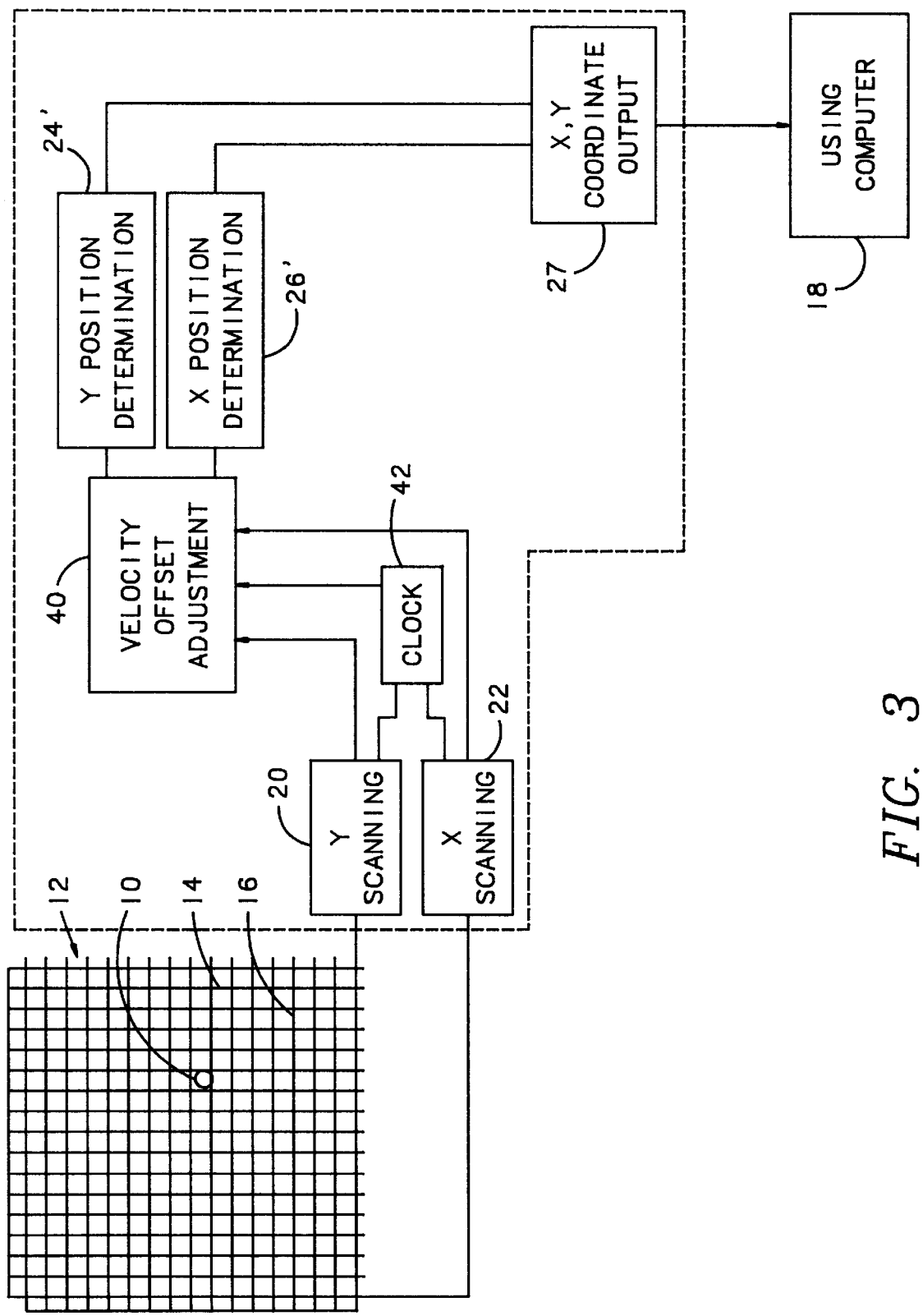
FIG. 3 is a simplified partial functional block diagram of a digitizer according to the present invention.

A digitizing system according to the present invention for implementing the methods thereof is depicted in FIG. 3. Components in common with the prior art system of FIG. 1 are labeled with like numbers. For purposes of the explanation which follows, we will assume that the digitizer is part of a pen-driven computing system. Thus, the magnetic pulses are generated by sending a current signal through a conductive coil 10 which is placed in the tip of a pen cursor and there is a screen having the grid 12 of horizontally and vertically criss-crossed wires 14, 16 associated therewith. As in the prior art, Y scanning circuitry 20 is connected to the vertical grid wires 16 and X scanning circuitry 22 is connected to the horizontal grid wires 14. Here, however, the circuitry changes. The outputs from the Y scanning circuitry 20 and X scanning circuitry 22 are connected to velocity offset adjustment circuitry 40 which accomplishes the methods of the present invention to be described in detail shortly. The velocity offset adjustment circuitry 40 is connected to Y position determination logic 24' and X position determination logic 26' which are modified over their counterparts in the prior art so as to accomplish the methods of the present invention. The present X,Y position of the coil 10 is then output by the output circuitry 27 to the computer 18 as in the prior art. For implementations where the sampling rate is irregular, a clock 42 connected to the Y scanning circuitry 20 and X scanning circuitry 22 for determining the time of each sample is also connected to the velocity offset adjustment circuitry 40.

The operation of the digitizing apparatus of FIG. 3 to accomplish the method of the present invention for the case where the scanning rate is regular (i.e. the X and Y grid wires are sequentially scanned alternately at regular intervals) will be described first with respect to FIG. 4. As shown therein, the positional track of the cursor 28 to be output to the computer 18 is determined in the following manner. A first X coordinate $X_1$ at 44, Y coordinate $Y_1$ at 46, and a second X coordinate $X_2$ at 48 are sampled at regular intervals of T (i.e. $T_1$, $T_2$, and $T_3$) to form a triplet $(X_1,Y_1,X_2)$ 50 of data. The $X_1$ and $X_2$ values are averaged together and combined with $Y_1$ to form a first coordinate pair:

$$[\{(X_1+X_2)/2\},Y_1]$$

whose position is determined to be at 46 rather than the offset trace point from the prior art approach. The next positional point is determined after point $Y_2$ is sampled at 52 forming the new data triplet $(Y_1,X_2,Y_2)$ 54. The Y values $Y_1$ and $Y_2$ are averaged together and combined with the X value $X_2$ to form the next coordinate pair:

$$[X_2,\{(Y_1+Y_2)/2\}]$$

whose position is determined to be at 48. This process is carried out for each new point sampled, be it X or Y. Since a new trace point is reported for each coordinate sampled rather than each coordinate pair sampled as was the case in the prior art, those of ordinary skill in the art will quickly recognize and appreciate that the rate at which the output circuitry 27 outputs positional coordinates to the computer 18 is actually doubled. Thus, in addition to providing more accurate positional data, the method of the present invention provides updates of the positional data to the computer at twice the rate of the prior art thereby increasing the accuracy of the system and reducing its potential for signal jitter.

In the preferred embodiment of the present invention as used with products of the assignee of this invention, the sampling rate of the digitizer grid is non-regular so as to allow the logic to process other aspects of the cursor pen such as button status. In other words, transmitting of the positional signal from the coil 10 is periodically replaced by transmitting of a button status signal. The position determination logic is already adapted to separate positional signals sensed in the grid wires from status signals, so that is not an issue with respect to the present invention. To implement the present invention under such conditions, a weighted average between the like components must be calculated using the period of time between samplings as the weighting factor. It is for this purpose that the clock 42 is included. This approach to the present invention is depicted in FIG. 5. During sampling period $T_{Y1}$ Y coordinate $Y_1$ 46 is sampled. X coordinate $X_2$ 48 is sampled during sampling period $T_{X2}$. No sample is taken at $T_3$ when the status information is being transmitted. $Y_2$ 52 is sampled during sampling period $T_{Y2}$, forming the triplet $(Y_1, X_2, Y_2)$ 56. The time-weighted average ($W_{avg}$) for the like components is calculated using the following equations:

$$Y_{Wavg} = Y_{sample1} + \left[ \frac{(T_{Xsample} - T_{Ysample1})}{(T_{Ysample2} - T_{Ysample1})} * (Y_{sample2} - Y_{sample1}) \right]$$

$$X_{Wavg} = X_{sample1} + \left[ \frac{(T_{Ysample} - T_{Xsample1})}{(T_{Xsample2} - T_{Xsample1})} * (X_{sample2} - X_{sample1}) \right]$$

For the triplet 56 the equation would be:

$$Y_{Wavg} = Y_1 + \left[ \frac{(T_{X2} - T_{Y1})}{(T_{Y2} - T_{Y1})} * (Y_2 - Y_1) \right]$$

Using this equation for the time-weighted Y positional value and combining the result with $X_2$ would provide the positional coordinate to output to the computer 18. Since $X_2$ is closer to $Y_1$ than to $Y_2$, the time weighting will make the time-weighted coordinate position output to the computer closer to $Y_1$ than to $Y_2$. In fact, if there is merely a skipping of one data sampling cycle as depicted in FIG. 5, the time-weighted value of Y would be coincident with $X_2$ in time and there would be virtually no offset between the apparent position and the actual position of the data point. If the sampling is truly random or at least non-regular during the status transmissions, there may not be coincidence between the apparent position and the actual position of the data point; however, the data will be more accurate than according to the prior art. And, it will also be at the doubled output rate.

Figure 6:
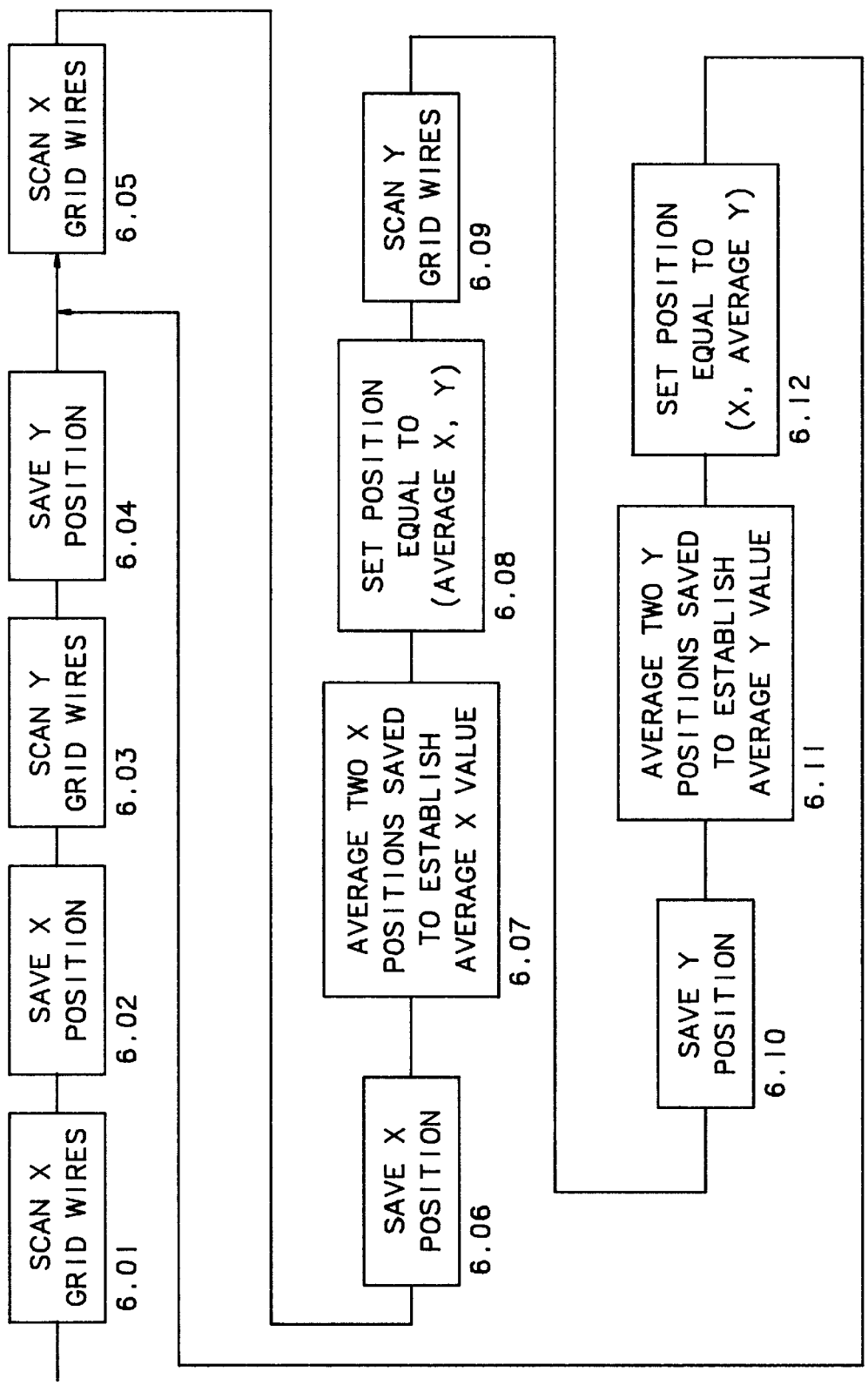
FIG. 6 is a flowchart of logic performed by the present invention for accomplishing the methods of FIGS. 4 and 5.

Generalized logic accomplished by the velocity offset adjustment circuitry 40 in combination with the Y position determination logic 24' and X position determination logic 26' to accomplish the methods of the present invention in its two approaches is depicted in FIG. 6. In blocks 6.01 through 6.06, the logic gathers the data for a positional coordinate triplet. In this case, it is an X-Y-X triplet. At block 6.07, the logic averages the two X values to get an average X value. If the regular sampling approach of FIG. 4 is being implemented, it is a simple average. If the non-regular sampling approach of FIG. 5 is being implemented, it is a time-weighted average as described above. In the case where a time-weighted average is being accomplished, those skilled in the art will readily recognize and appreciate that the blocks of the logic stating that the sampled position is to be saved include the saving of the time of the clock 42 at the time the sample was obtained so that the associated time of each sample will be available for use in calculating the time-weighted average in the manner described above. In either case, at block 6.08 the position of the cursor at that point is set to be equal to the average X and sampled Y. That position can then be output to the computer.

At blocks 6.09 and 6.10, the next Y value is obtained forming the second data triplet, i.e. a Y-X-Y triplet. At block 6.11, the logic averages the two Y values to get an average Y value (regular or time-weighted). At block 6.12, the position of the cursor at that point is set to be equal to the average Y and sampled X. That position can then be output to the computer. Once the stream of triplet data has been started in the above manner, the logic can then loop back to block 6.05 to continue the process. Obviously, the entire triplet forming process could begin with a Y value instead of an X value as described.

Wherefore having thus described the present invention, what is claimed is:

1. A method for determining positions of a moving cursor on a digitizer grid comprising the steps of:
    a) obtaining a first sample of a positional signal from the cursor in the digitizer grid in a first coordinate axis of a coordinate system associated with the digitizer grid;
    b) obtaining a first sample of a positional signal from the cursor in the digitizer grid in a second coordinate axis of the coordinate system which is perpendicular to the first coordinate axis;
    c) obtaining a second sample of a positional signal from the cursor in the digitizer grid in the first coordinate axis;
    d) combining the second sample from the first coordinate axis with the first sample from the first coordinate axis to form an average; and,
    e) outputting the average along with the first sample in the second coordinate axis as a present position of the cursor in the coordinate system.

2. The method of claim 1 and additionally comprising the steps of:
    a) obtaining a second sample of a positional signal from the cursor in the digitizer grid in the second coordinate axis;
    b) combining the second sample from the second coordinate axis with the first sample from the second coordinate axis to form an average; and,
    c) outputting the average along with second sample in the first coordinate axis as a subsequent present position of the cursor in the coordinate system.

3. The method of claim 1 wherein:
    said step of combining the second sample from the first coordinate axis with the first sample from the first coordinate axis to form an average includes the step of employing a time of acquisition of the first sample and a time of acquisition of the second sample to make the average a time-weighted average.

4. In a digitizer system where a cursor is moved over a digitizer grid, a method of sequentially outputting X,Y positions of the cursor in an X,Y coordinate system having an X axis and a Y axis perpendicular to the X axis comprising the steps of:
    a) obtaining a first sample of a positional signal from the cursor in the digitizer grid in a first axis of the X,Y coordinate system;
    b) obtaining a first sample of a positional signal from the cursor in the digitizer grid in a second axis of the X,Y coordinate system;
    c) obtaining a second sample of a positional signal from the cursor in the digitizer grid in the first coordinate axis to form a positional data triplet;

d) combining the second sample from the first coordinate axis with the first sample from the first coordinate axis to form a first average;

e) outputting the first average along with the first sample in the second coordinate axis as a first position of the cursor in the coordinate system;

f) obtaining a second sample of a positional signal from the cursor in the digitizer grid in the second coordinate axis to form another positional data triplet;

g) combining the second sample from the second coordinate axis with the first sample from the second coordinate axis to form a second average;

h) outputting the second average along with the second sample in the first coordinate axis as a subsequent present position of the cursor in the coordinate system; and, i) repeating steps (c) through (h) to form sequential data triplets and output further subsequent present positions of the cursor in the coordinate system.

5. The method of claim 4 wherein:

each step of combining samples to form an average includes the steps of employing a time of acquisition of each of two samples and calculating the average as a time-weighted average.

6. In a digitizer system where a cursor is moved over a digitizer grid, an apparatus for determining positions of the cursor when moving on the digitizer grid comprising:

a) means for obtaining a first sample of a positional signal from the cursor in the digitizer grid in a first coordinate axis of a coordinate system associated with the digitizer grid;

b) means for obtaining a first sample of a positional signal from the cursor in the digitizer grid in a second coordinate axis of the coordinate system which is perpendicular to the first coordinate axis;

c) means for obtaining a second sample of a positional signal from the cursor in the digitizer grid in the first coordinate axis;

d) means for combining the second sample from the first coordinate axis with the first sample from the first coordinate axis to form an average; and, e) means for outputting the average along with the first sample in the second coordinate axis as a present position of the cursor in the coordinate system.

7. The apparatus of claim 6 and additionally comprising:

a) means for obtaining a second sample of a positional signal from the cursor in the digitizer grid in the second coordinate axis;

b) means for combining the second sample from the second coordinate axis with the first sample from the second coordinate axis to form an average; and, c) means for outputting the average along with the second sample in the first coordinate axis as a subsequent present position of the cursor in the coordinate system.

8. The apparatus of claim 6 wherein:

said means for combining the second sample from the first coordinate axis with the first sample from the first coordinate axis to form an average includes means for employing a time of acquisition of the first sample and a time of acquisition of the second sample to make the average a time-weighted average.

9. In a digitizer system where a cursor is moved over a digitizer grid, apparatus for sequentially outputting X,Y positions of the cursor in an X,Y coordinate system having an X axis and a Y axis perpendicular to the X axis comprising:

a) means for obtaining a first sample of a positional signal from the cursor in the digitizer grid in a first axis of the X,Y coordinate system;

b) means for obtaining a first sample of a positional signal from the cursor in the digitizer grid in a second axis of the X,Y coordinate system;

c) means for obtaining a second sample of a positional signal from the cursor in the digitizer grid in the first coordinate axis to form a positional data triplet;

d) means for combining the second sample from the first coordinate axis with the first sample from the first coordinate axis to form a first average;

e) means for outputting the first average along with the first sample in the second coordinate axis as a first position of the cursor in the coordinate system;

f) means for obtaining a second sample of a positional signal from the cursor in the digitizer grid in the second coordinate axis to form another positional data triplet;

g) means for combining the second sample from the second coordinate axis with the first sample from the second coordinate axis to form a second average;

h) means for outputting the second average along with the second sample in the first coordinate axis as a subsequent present position of the cursor in the coordinate system; and, i) means for causing said foregoing means (c) through (h) to form sequential data triplets and output further subsequent present positions of the cursor in the coordinate system.

10. The apparatus of claim 9 wherein:

each means combining samples to form an average includes means for employing a time of acquisition of each of two samples and for calculating the average as a time-weighted average.

11. In a pen-driven computing system where a cursor is moved over a display having a digitizer grid associated therewith, a method of sequentially outputting accurate X,Y positions of the cursor in an X,Y coordinate system having an X axis and a Y axis perpendicular to the X axis during rapid movement of the cursor over the display comprising the steps of:

a) obtaining a first sample of a positional signal from the cursor in the digitizer grid in the X axis of the coordinate system;

b) obtaining a first sample of a positional signal from the cursor in the digitizer grid in the Y axis of the X,Y coordinate system;

c) obtaining a second sample of a positional signal from the cursor in the digitizer grid in the X axis to form a positional data triplet $X_1, Y_1, X_2$;

d) combining the $X_1$ sample with the $X_2$ sample to form an average $X_{AVE}$;

e) outputting $X_{AVE}$ along with $Y_1$ as a first position of the cursor;

f) obtaining a second sample of a positional signal from the cursor in the digitizer grid in the Y axis to form another positional data triplet $Y_1, X_2, Y_2$;

g) combining the $Y_1$ sample with the $Y_2$ sample to form an average $Y_{AVE}$;

h) outputting $Y_{AVE}$ along with $X_2$ as a subsequent present position of the cursor in the coordinate system; and, i) repeating steps (c) through (h) to form sequential data triplets and output further subsequent present positions of the cursor in the coordinate system.

12. The method of claim 11 wherein:

each step of combining samples to form an average includes the steps of employing a time of acquisition of each of two samples and calculating the average as a time-weighted average.

13. In a pen-driven computing system where a cursor is moved over a display having a digitizer grid associated therewith, control logic for sequentially outputting accurate X,Y positions of the cursor in an X,Y coordinate system having an X axis and a Y axis perpendicular to the X axis during rapid movement of the cursor over the display comprising:

a) first logic means for obtaining a first sample of a positional signal from the cursor in the digitizer grid in the X axis of the coordinate system;

b) second logic means for obtaining a first sample of a positional signal from the cursor in the digitizer grid in the Y axis of the X,Y coordinate system;

c) third logic means for obtaining a second sample of a positional signal from the cursor in the digitizer grid in the X axis to form a positional data triplet $X_1,Y_1,X_2$;

d) fourth logic means for combining the $X_1$ sample with the $X_2$ sample to form an average $X_{AVE}$;

e) fifth logic means for outputting $X_{AVE}$ along with $Y_1$ as a first position of the cursor;

f) sixth logic means for obtaining a second sample of a positional signal from the cursor in the digitizer grid in the Y axis to form another positional data triplet $Y_1,X_2,Y_2$;

g) seventh logic means for combining the $Y_1$ sample with the $Y_2$ sample to form an average $Y_{AVE}$;

h) eighth logic means for outputting $Y_{AVE}$ along with $X_2$ as a subsequent present position of the cursor in the coordinate system; and, i) ninth logic means for employing said first logic means through said eighth logic means to form sequential data triplets and output further subsequent present positions of the cursor in the coordinate system.

14. The control logic of claim 13 wherein:

each logic means combining samples to form an average includes means for employing a time of acquisition of each of two samples and for calculating the average as a time-weighted average.

15. A digitizing system wherein a cursor is moved over a digitizer grid for sequentially outputting accurate X,Y positions of the cursor in an X,Y coordinate system associated with the digitizer grid during rapid diagonal movement of the cursor with respect to the X,Y coordinate system comprising:

a) a digitizer grid defining an X,Y coordinate system having an X axis and a Y axis perpendicular to the X axis;

b) a cursor for movement over said digitizer grid;

c) sensing means for sensing positions of said cursor in said X,Y coordinate system and for outputting positional signals indicating present positions of said cursor along said X axis and said Y axis, respectively;

d) position calculation and output means for using pairs of adjacent positional signals in said X axis and associated times of acquisition thereof to form time weighted average X axis positional signals, for combining said time weighted average X axis positional signals with associated Y axis positional signals into adjusted X,Y positional signals, and for outputting said adjusted X,Y positional signals.

16. The digitizing system of claim 15 and additionally comprising:

said position calculation and output means including means for using pairs of adjacent positional signals in said Y axis and associated times of acquisition thereof to form time weighted average Y axis positional signals, for combining said time weighted average Y axis positional signals with associated X axis positional signals into adjusted X,Y positional signals, and for outputting said adjusted X,Y positional signals.

17. The digitizing system of claim 15 wherein said position calculation and output means comprises:

a) clock means for associating a time of acquisition with each positional signal for said X axis and each positional signal for said Y axis;

b) first logic means for obtaining a first sample of a positional signal from the cursor in the digitizer grid in the X axis of the coordinate system;

c) second logic means for obtaining a first sample of a positional signal from the cursor in the digitizer grid in the Y axis of the X,Y coordinate system;

d) third logic means for obtaining a second sample of a positional signal from the cursor in the digitizer grid in the X axis to form a positional data triplet $X_1,Y_1,X_2$;

e) fourth logic means for combining the $X_1$ sample and its time of acquisition $TX_1$ with the $X_2$ sample and its time of acquisition $TX_2$ to form a time-weighted average $X_{WAVE}$;

f) fifth logic means for outputting $X_{WAVE}$ along with $Y_1$ as a first position of the cursor;

g) sixth logic means for obtaining a second sample of a positional signal from the cursor in the digitizer grid in the Y axis to form another positional data triplet $Y_1,X_2,Y_2$;

h) seventh logic means for combining the $Y_1$ sample and its time of acquisition $TY_1$ with the $Y_2$ sample and its time of acquisition $TY_2$ to form an average $Y_{WAVE}$;

i) eighth logic means for outputting $Y_{WAVE}$ along with $X_2$ as a subsequent present position of the cursor in the coordinate system; and, j) ninth logic means for employing said first logic means through said eighth logic means to form sequential data triplets and output further subsequent present positions of the cursor in the coordinate system.

* * * * *